United States Patent [19]
Koh

[11] Patent Number: 5,696,925
[45] Date of Patent: Dec. 9, 1997

[54] MEMORY MANAGEMENT UNIT WITH ADDRESS TRANSLATION FUNCTION

[75] Inventor: Dong-Bum Koh, Seoul, Rep. of Korea

[73] Assignee: Hyundai Electronics Industries, Co., Ltd., Kyoungki-do, Rep. of Korea

[21] Appl. No.: 525,881

[22] Filed: Sep. 8, 1995

Related U.S. Application Data

[63] Continuation-in-part of Ser. No. 22,237, Feb. 25, 1993, abandoned.

[30] Foreign Application Priority Data

Feb. 25, 1992 [KR] Rep. of Korea ............... 92-2912

[51] Int. Cl.⁶ ............... G06F 12/10; G06F 9/26; G06F 12/00
[52] U.S. Cl. ............... 395/413; 395/414; 395/415; 395/416; 395/417; 395/418; 395/412
[58] Field of Search ............... 395/413, 414, 395/415, 416, 417, 418, 412

[56] References Cited

U.S. PATENT DOCUMENTS

| | | | |
|---|---|---|---|
| 4,763,244 | 8/1988 | Moyer et al. | 395/416 |
| 4,774,659 | 9/1988 | Smith et al. | 395/418 |
| 4,800,489 | 1/1989 | Moyer et al. | 395/416 |
| 5,319,760 | 6/1994 | Mason et al. | 395/418 |
| 5,426,750 | 6/1995 | Becker et al. | 395/417 |

OTHER PUBLICATIONS

Sparc Architecture, Cypress Semiconductor, Ross Technology Subsidiary, Sparc Rise User's Guide, Second Edition, Feb. 1990, pp. 4–11.

*Primary Examiner*—David K. Moore
*Assistant Examiner*—Than V. Nguyen
*Attorney, Agent, or Firm*—Pennie & Edmonds LLP

[57] ABSTRACT

Memory management unit with address translation function improves the translation speed for virtual addresses and minimizes the deviation in response time. The memory management unit translates partially and entirely the virtual address into an physical address by using four extended auxiliary caches. And the memory management unit performs table walks for the zest part of the virtual address which is not translated, by using four tables contained in main memory.

3 Claims, 7 Drawing Sheets

Index Tag Register

Instruction PTP Register

Data PTP Register

RP Register

MEMORY MANAGEMENT UNIT WITH ADDRESS TRANSLATION FUNCTION

This application is a continuation of application Ser. No. 08/022,237, filed Feb. 25, 1993, now abandoned.

BACKGROUND OF THE INVENTION

1. Field of the Invention

The present invention relates to a memory management unit having a function to translate a virtual address generated from a processor into a physical address that designates an actual memory location in the memory, and more particularly to a memory management unit with address translation function capable of achieving an improvement in address translation speed.

2. Description of the Prior Art

Generally, virtual addresses mean addresses of virtual memory locations. Although such virtual addresses can not be referenced by actual hardware, they can be used by programs. Where a plurality of programs, namely, operating systems are provided in a computer, virtual addresses are individually set in association with the programs.

On the other hand, physical addresses are indicative of addresses of memory locations in the main memory included in a memory. Typically, such physical addresses are different from virtual addresses. This is because processors included in the computer use the memory locations of the main memory which are grouped in multi-levels in accordance with the operating systems and the content of information. For reference, grouping the memory locations of main memory will be described.

Memory management units require a function to translate a virtual address into a physical address. To obtain such an address translation function, the memory management units use a page table showing the relation between the virtual and physical addresses. Such a page table is stored in the main memory. The main memory has page tables corresponding in number to the grouping levels of the memory locations in the main memory. For example, where the main memory has four grouping levels, it includes four page tables, namely, a context table and first to third level page tables.

For reference, grouping the main memory into four levels will be described. The main memory is primarily divided into a plurality of macroblocks in accordance with the kinds of works, namely, operating systems. The memory location of each macroblock is divided into a plurality of first level pages each having a middle block size. Each of the first level pages is divided into a plurality of second level pages having a small block size. Also, each of the second level pages is divided into a plurality of third level pages each having a microblock size. Each of the third level pages is divided into a plurality of word memory locations each storing one word data.

Where several page tables are provided at a main memory, a lot of time is taken for the memory management unit to translate one virtual address into a corresponding physical address. This is because the memory management unit should carry out table works corresponding in number to the number of page tables.

As a conventional memory management unit capable of achieving an improvement in address translation speed even when a plurality of page tables are used, "CY7C604/605 Cache Controller and Memory Management Unit (hereinafter, referred to as "CMU")" has been commercially available from Cypress Semiconductor Corporation. This CMU utilizes both an address translation method using a translation look aside buffer (TLB) and an address translation method using a page table pointer cache, in addition to the translation method utilizing the table works.

The TLB is constituted bV a plurality of virtual parts each including fields and contexts of first to third indexes included in each virtual address and a plurality of physical parts each including page pointer numbers. Each of the virtual parts comprises a content addressable memory cell array whereas each of the physical parts comprises a dynamic random access memory cell array. The-TLB allows the CMU to translate a certain number of virtual addresses into physical addresses without executing the page works virtual addresses registered in the TLB are those frequently and recently used.

The page table pointer cache is used in cases where the TLB can no longer translate a virtual address into a physical address. Accordingly, the page table pointer cache reduces the number of Table works. As shown in FIG. 1, the page table pointer cache comprises an index tag register, an instruction page table pointer (IPTP) register, a data page table pointer (DPTP) register, and a root pointer (RP) register. The index tag register includes ITAG and DTAG fields. The ITAG and DTAG fields are stored with indexes, such as first and second indexes, included in virtual addresses. The information stored in the DTAG and ITAG fields are compared with a part of the virtual addresses, namely, their first and second indexes.

Instruction access page table pointers, data access page table pointers and root pointers are stored in the instruction page table pointer register, the data page table pointer register, and the root pointer register, respectively. These pointers are selectively used, based on the result of the comparison between the information stored in the DTAG and ITAG fields and the part of virtual addresses (namely, the first and second indexes).

However, the information stored in the page table pointer cache becomes invalid when its context is changed. Therefore, it is not good that context switching frequently occurs. Moreover, since only one of each entry exists, IPTP and DPTP must be replaced with a new value when the table of four new steps is accessed. Therefore, the disadvantage is that the table access of the main memory is processed once more when the previous value which has not been replaced is used again. Fox the above reason, all entries are invalidated when the context is switched. In the case of a real-time system or an embedded controller system, all entries are frequently invalidated, since the context is frequently switched.

FIG. 2 illustrates a table work mechanism which is executed when the TLB and page table pointer cache can not be used for an address translation. Referring to FIG. 2, to reduce the size of the page table when the address is translated, the page table is divided into tables with several steps, and several table accesses are processed. Although it does not matter with how many steps the table access is processed, the table access with four steps is described in the present invention. During a table access with four steps, a virtual address is divided into four parts, and the table access for carrying Page Table Entry (PTE) containing Physical Page Number (PPN) is also divided into four parts, where Context Table stands for the table accessed first, and RP stands for the value of the pointer address stored in the above context Table. The above RP is used as the address accessing page table of the next step. Therefore, it is necessary that four memory accesses are processed to carry a PTE containing a PPN, according to the above procedures.

When a table is accessed by a miss of TLB, PTPC of level 2 is stored within an external register for reducing the overhead from memory access. If the above stored values are used during the next TLB miss, only one memory access is needed. Therefore, this operation is very efficient. At this moment, for determining whether the PTP value of level 2 is used in the next access, INDEX 1 and INDEX 2 part of the virtual address are stored to TAG field, and when compared to the TAG field within the same context for using the PTP of level 2 during TLB miss. If a hit results from the comparison between the TAG field and INDEX I and INDEX 2 part of the virtual address, the above access indicates a table access with four steps because the validation of the PTP means that the case processing through the table access with four steps exists in the same context.

Further detailed description of the TLB, table work mechanism and page table pointer cache can be made by referring to "Sparc Architecture, Cypress Semiconductor, Ross Technology Subsidiary, Sparc Rise User's Guide, second edition—February 1990, pp 4–11".

Although the above-mentioned conventional memory management unit improves the address translation speed more or less by using the TLB, page table pointer cache and table works in combination, involves a large deviation in response speed occurring upon a change in virtual address. Furthermore, the improvement in address translation speed is limited to a certain level.

SUMMARY OF THE INVENTION

Therefore, an object of the invention is to provide a memory management unit having an address translation function capable of achieving an improvement in translation speed for virtual addresses and yet minimizing the deviation in response time.

In accordance with the present invention, this object is accomplished by providing a memory management unit with address translation function for use in computer system having first, second and third page tables, comprising a context register fox receiving a present context number; a context pointer register for receiving a context pointer; an address register for receiving the virtual address having a page offset and first second and third indexes; first translating means for translating directly the context number and the first, second and third indexes into a physical page number and generating a first hit signal, said hit signal indicating whether the translation to the physical page number is successful; second translating means for translating directly the context number and the first and second indexes into a first level page table pointer and generating a second hit signal; third translating means for translating directly the context number and the first index into a second level page table pointer and generating a third hit signal; fourth translating means for translating directly the context number into a root pointer and generating fourth hit signal; first address retrieving means for reading a root pointer from the context table by using the context number and the context pointer; second address retrieving means for reading the second level page table pointer from the first page table by using the first index and the root pointer from the first address retrieving means if the fourth hit signal is off or the fourth translating means if the fourth hit signal is on; third address retrieving means for reading the first level page table pointer from the second page table by using the second index and the second level page table pointer from the second address retrieving means if the third hit signal is off the third translating means if the third hit signal is on fourth address retrieving means for reading the physical page number from the third page table by using the third index and the first level page table pointer from the third address retrieving means if the second hit signal is off or the second translating means if the second hit signal is on address combining means for concatenating the page offset and the physical page number from the first translating means if the first hit signal is on or the fourth address retrieving means to generate the physical address if the first hit signal is off and hit determining means for checking logical values of the first through fourth translating means to control the operations of the first through fourth address retrieving means in accordance with the logic values of the first through fourth translating means.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
FIG. 1 is a diagram explaining a page table pointer cache used in a conventional memory management unit.
Figure 1:
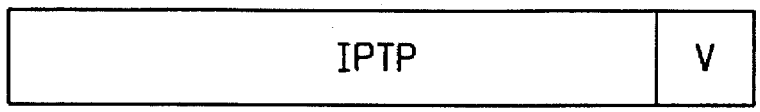
Figure 1:
Figure 1:
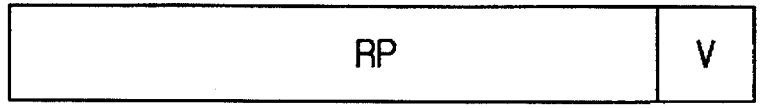
Figure 2:
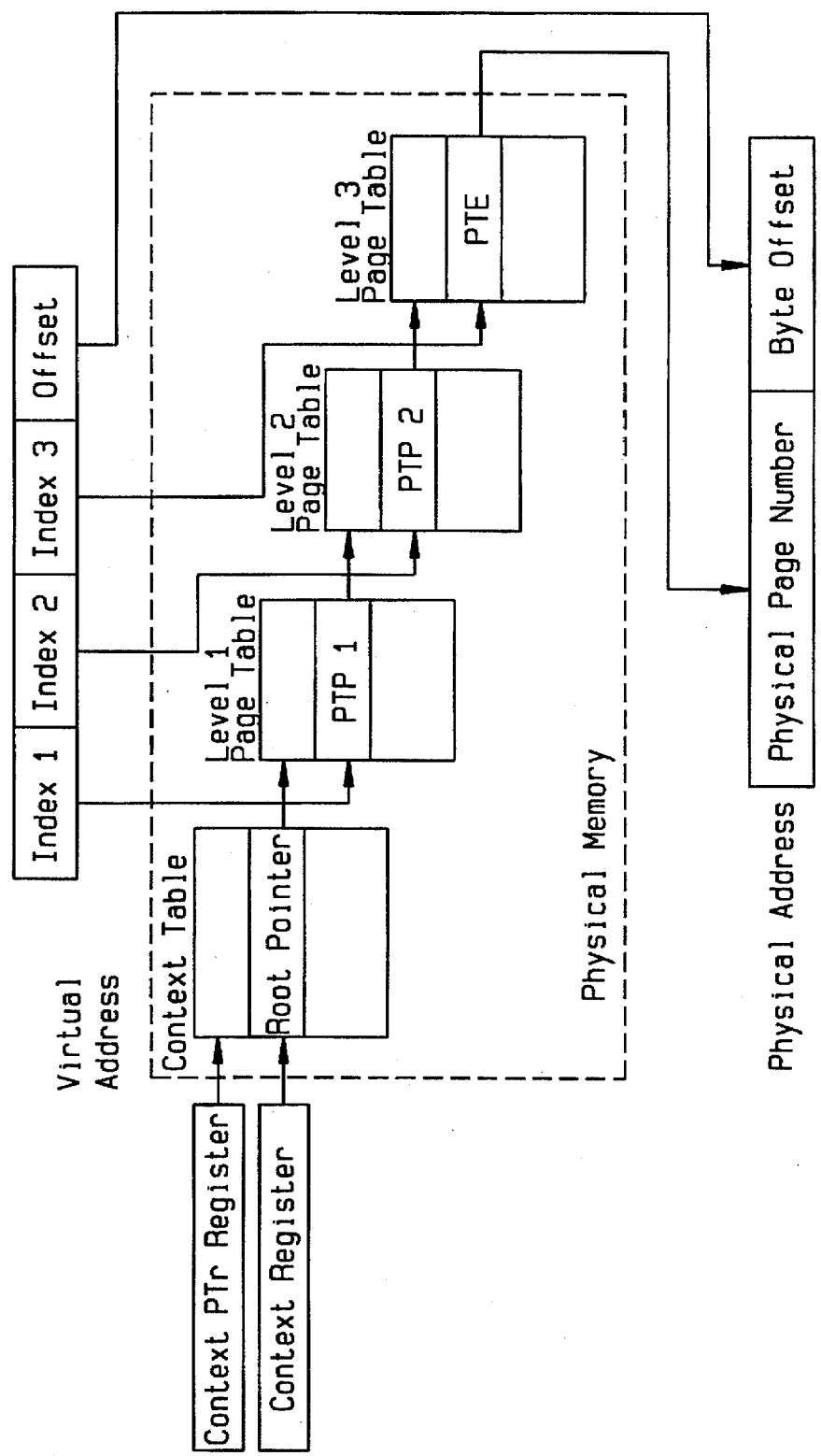
FIG. 2 is a block diagram illustrating a page work mechanism used in the conventional memory management unit.
Figure 3:
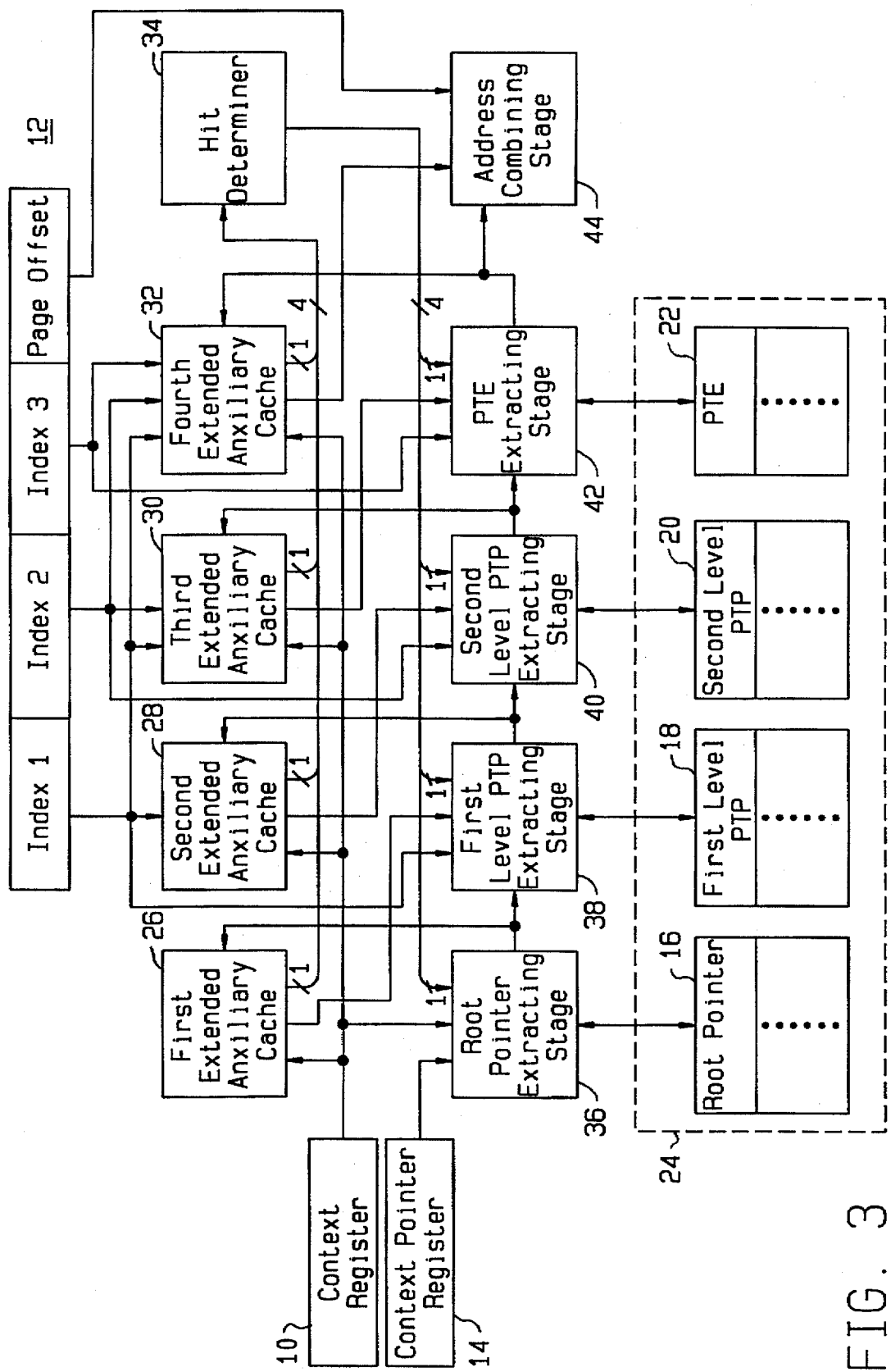
FIG. 3 is a block diagram illustrating a memory management unit having an address translation function in accordance with the present invention.

Referring to FIG. 3, a memory management unit is shown which includes a context register 10, a virtual address register 12 and a context pointer register 14 in accordance with the present invention. The context register 10 is stored with contexts which are varied in logical value in accordance with operating systems and their conditions. Each context is supplied in common to first to fourth extended auxiliary caches 26, 28, 30 and 32. The context pointer register 14 is stored with context pointers each indicative of the position of information to be referenced by the operating system. Each context pointer is supplied to a root pointer extracting stage 36. Each context and each context pointer designate a corresponding one of multiple macroblocks constituting a main memory.

The virtual address register 12 is stored with a virtual address classified into a first index field, a second index field, a third index field and a page offset field. The virtual address is set in accordance with the operating system. The first index designates one of multiple first level pages (namely, middle blocks) constituting one of the macroblocks together. The first index is constituted by 8-bit binary data and positioned from the 24-th bit to the 31-st bit in the virtual address. The second index designates one of multiple second level pages (namely, microblocks) constituting one of the first level pages together. The second index is constituted by 6-bit binary data and positioned from the 28-th bit to the 23-rd bit in the virtual address. The third index designates one of multiple third level pages constituting one of the second level pages together. The third index is constituted by 6-bit binary data and positioned from the 12-th bit to the 17-th bit in the virtual address. The page offset field designates one of multiple word memory locations constituting one of the third level pages together. The page offset field is constituted by 12-bit binary data and positioned from the 0=th bit to the 11-th bit in the virtual address. The context, virtual address and context pointer stored in the context register 10, virtual address register 12 and context pointer register 14 are changed by processors not shown, respectively.

The first extended auxiliary cache 26 includes a comparison section stored with a plurality of reference contexts and a random access memory (RAM) section stored with a plurality of root pointers. The comparison section of the first extended auxiliary cache 26 serves to determine whether there is a reference context having the same logical value as the context stored in the context register 10. Where there is a reference context having the same logical value as the context stored in the context register 10, the comparison section of the first extended auxiliary cache 26 serves to read a root pointer corresponding to the context out of the associated RAM section and generate a first hit signal with a high logical value.

The second extended auxiliary cache 28 includes a comparison section stored with a plurality of first reference contexts and RAM section stored with a plurality of second level PTP. Each of pointer (hereinafter, referred to as "PTP"). Each of the first reference indexes is constituted by a context and the first index of a virtual address. The comparison section of the second extended auxiliary cache 28 serves to determine whether there is a first reference context having the same logical value as those of the context stored in the context register 10 and the first index stored in the virtual address register 12. Where there is a first reference context having the same logical value as those of the context stored in the context register 10 and the first index stored in the virtual address, the comparison section of the second extended auxiliary cache 28 serves to read a first level PTP corresponding to the context out of the associated RAM section and generate a second hit signal with a high logical value.

The third extended auxiliary cache 30 includes a comparison section stored with a plurality of second reference contexts and a RAM section stored with a plurality of second level PTP. Each of the second reference indexes is constituted by a context and the first and second indexes of a virtual address. The comparison section of the third extended auxiliary cache 30 serves to determine whether there is a second reference context having the same logical value as those of the context stored in the context register 10 and the first and second indexes stored in the virtual address register 12. Where there is a second reference context having the same logical value as those of the context stored in the context register 10 and the first and second indexes of the virtual address, the comparison section of the third extended auxiliary cache 30 serves to read a second level PTP corresponding to the context out of the associated RAM section and generate a third hit signal with a high logical value.

The fourth extended auxiliary cache 32 includes a comparison section stored with a plurality of third reference contexts and a RAM section stored with a plurality of page table entries (hereinafter, referred to as "PTE"). Each of the third reference indexes is constituted by a context and the first to third indexes of a virtual address. The comparison section of the fourth extended auxiliary cache 32 serves to determine whether there is a third reference context having the same logical value as those of the context stored in the context register 10 and the first to third indexes stored in the virtual address register 12. Where there is a third reference context having the same logical value as those of the context stored in the context register 10 and the first to third indexes of the virtual address, the comparison section of the fourth extended auxiliary cache 32 serves to read a PTE corresponding to the context out of the associated RAM section and generate a fourth hit signal with a high logical value.

The memory management unit further includes a root pointer extracting stage 36, a first level PTP extracting stage 38, a second level PTP extracting stage 40 and a PTE extracting stage 42 respectively adapted to access the main memory 24 and thereby extract a root pointer, a first level PTP, a second level PTP, and a PTE. In order to indicate the relation between the virtual and physical addresses, the main memory 24 includes a context table 16, a first level page table 18, a second level page table 20 and a third level page table 22. The context table 16 is stored with a plurality of root pointers. The first level page table 18 is stored with a plurality of first level PTP's. The second level page table 20 is stored with a plurality of second level PTP's. On the other hand, the third level page table 22 is stored with a plurality of PTE's.

The root pointer extracting stage 36 concatenates the context from the context register 10, the context pointer from the context pointer register 14 and 2-bit data having a logical value of "0", thereby generating a root pointer address. This root pointer address has the form of a bit string in which a 22-bit context pointer, a 12-bit context and 2-bit redundancy data are arranged in a sequential manner. The root pointer extracting stage 36 reads a root pointer out of a memory location on the context table 16 corresponding to the logical value of the root pointer address. The root pointer extracting stage 36 also supplies the read root pointer to the first level PTP extracting stage 38 and checks about the logical value of a cache bit included in the root pointer. When the cache bit has a logical value of "1", the root pointer extracting stage 36 supplies the read root pointer to the first extended auxiliary cache 26 so that the root pointer can be registered in the first extended auxiliary cache 26 along with the context from the context register 10. The root pointer is classified into root pointer data of the high-order 26 bits and associated control data of the remainder, low-order 6 bits.

The first level PTP extracting stage 38 combines and concatenates the root pointer from the root pointer extracting stage 36 or first extended auxiliary cache 26 and the first index from the virtual address buffer 12, thereby generating a first level PTP address. This first level PTP address has the form of a bit string in which the high-order 26-bit root pointer data of the root pointer and the 8-bit first index are arranged in a sequential manner. The first level PTP pointer extracting stage 38 reads a first level PTP out of a memory location on the first level page table 18 corresponding to the logical value of the first level PTP address. The first level PTP extracting stage 38 also supplies the read first level PTP to the second level PTP extracting stage 40 and checks about the logical value of a cache bit included in the first level PTP. When the cache bit has a logical value of "1", the first level PTP extracting stage 38 supplies the read first level PTP to the second extended auxiliary cache 28 so that the first level PTP can be registered in the second extended auxiliary cache 28 along with the context from the context register 10 and the third index from the virtual address register 12. The first level PTP is classified into first level PTP data of the high-order 28 bits and associated control data of the remainder, low-order 4 bits.

The second level PTP extracting stage 40 combines and concatenates the first level PTP from the first level PTP extracting stage 38 or second extended auxiliary cache 28 and the second index from the virtual address buffer 12, thereby generating a second level PTP address. This second level PTP address has the form of a bit string in which the high-order 28-bit first level PTP data of the first level PTP and the 6-bit second index are arranged in a sequential manner. The second level PTP pointer extracting stage 40 reads a second level PTP out of a memory location on the second level page table 20 corresponding to the logical value of the second level PTP address. The second level PTP extracting stage 40 also supplies the read second level PTP to the PTE extracting stage 42 and checks about the logical value of a cache bit included in the second level PTP, when the cache bit has a logical value of "1", the second level PTP extracting stage 40 supplies the read second level PTP to the third extended auxiliary cache 30 so that the second level PTP can be registered in the third extended auxiliary cache 30 along with the context from the context register 10 and the first and second indexes from the virtual address register 12. The second level PTP is classified into second level PTP data of the high-order 28 bits and associated control data of the remainder, low-order 4 bits.

The PTE extracting stage 42 combines the second level PTP from the second level PTP extracting stage 40 or third extended auxiliary cache 30 and the third index from the virtual address buffer 12, thereby generating a PTE address. This PTE pointer address has the form of a bit string in which the high-order 28-bit second level PTP data of the second level PTP and the 6-bit third index are arranged in a sequential manner. The PTE extracting stage 42 reads a PTE out of a memory location on the third level page table 22 corresponding to the logical value of the PTE address and checks about the logical value of a cache bit included in the PTE. When the cache bit has a logical value of "1", the PTE extracting stage 42 supplies the read PTE to the fourth extended auxiliary cache 32 so that the PTE can be registered in the fourth extended auxiliary cache 32 along with the context from the context register 10 and the first and second indexes from the virtual address register 12. The read PTE is classified into a physical page number (PPN) of the high-order 24 bits and associated control data of the remainder, low-order 12 bits.

The memory management unit further includes a hit determiner 34 for receiving the first to fourth hit signals from the first to fourth extended auxiliary caches 26, 28, 30 and 32, respectively, and an address combining stage 44 for receiving the PTE from the PTE extracting stage 42 and fourth extended auxiliary cache 32.

The address combining stage 44 combines the PTE from the PTE extracting stage 42 and fourth extended auxiliary cache 32 with the page offset from the virtual address register 12, thereby generating a physical address. This physical address has the form of a bit string in which the high-order 24-bit PPN of the PTE and the 12-bit page offset are arranged in a continuous manner. The physical address is output through an output line 11.

The hit determiner 34 checks about logical states of the first to fourth hit signals, thereby detecting respective translation enabling ranges of the context stored in the context register 16 and the first to third indexes stored in the virtual address register 12. Based on the detected translation ranges, the hit determiner 34 controls operations of the root pointer extracting stage 36, the first and second PTP extracting stages 38 and 40 and the PTE extracting stage 42. This will be described in detail.

First, where all the first to fourth hit signals have a low logical value the hit determiner 34 controls the root pointer extracting stage 36, the first and second PTP extracting stages 38 and 40 and the PTE extracting stage 42 so that they can operate.

Second, where the first hit signal has a high logical value, the hit determiner 34 controls the first and second PTP extracting stages 38 and 40 and the PTE extracting stage 42 so that they can operate.

Third, where the second hit signal has a high logical value, the hit determiner 34 controls the second PTP extracting stage 40 and the PTE extracting stage 42 so that they can operate.

Fourth, where the third hit signal has a high logical value, the hit determiner 34 controls only the PTE extracting stage 42 so that they can operate.

Finally, where the fourth hit signal has a high logical value, the hit determiner 34 controls the first and second PTP extracting stages 38 and 40 and the PTE extracting stage 42 so that they can not operate.

Figure 4:
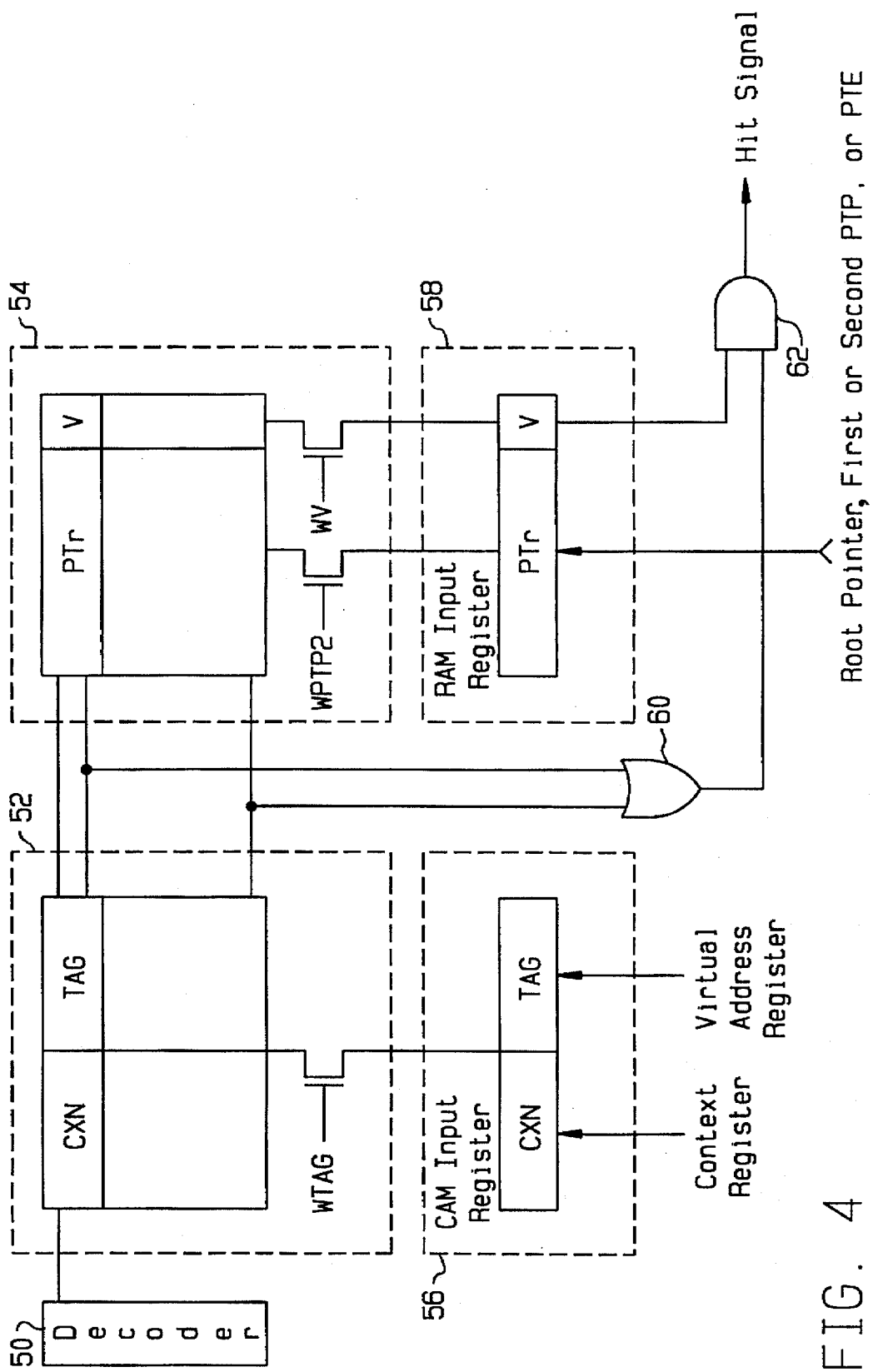
FIG. 4 is a block diagram illustrating the first through fourth extended auxiliary caches shown in FIG. 3.

FIG. 4 is a block diagram of the first through fourth auxiliary cache shown in FIG. 3. Referring to FIG. 4, when context switching frequently occurs in the zeal-time and embedded controller system, the TAG field and CXN part are added in the comparative part for removing the disadvantage of invalidating the selected Pointer. For adding the TAG field and CXN in the comparative part, the TAG and CXN part consist of CAM (Content Addressable Memory) 52, and the Pointer consists of RAM (Random Access Memory) 54, respectively. Therefore, the RAM 54 part is read by match of CAM 52. In the above structure, the Pointer cannot be set up in the RAM part 54. Even though it is possible to set up the Pointer in the RAM part 54, it is omitted because of the complicated peripheral circuits control. The CAM 52 has a plurality of CAM cell arrays and the RAM 54 is composed of a plurality of RAM cell arrays.

CAM 52 is a memory apparatus that quickly searches only data with the given characteristics within several memorized data. For approaching the information memorized within the memory apparatus, CAM 52 finds out the location of the wanted information by utilizing a part of the memorized information instead of using the address. Thereafter, CAM 52 may approach the other information from that location. For example, if the context is not translated, it is preferable that the additional Root Pointer Register is set up at outside, because the Root Pointer always results in efficient performance. Therefore, as the above structure is selected, the number of Pointers can be easily extended, and a loss occurred by using only one entry is prevented.

In the case of using one entry, the Pointer is replaced by a table access with at least one new step. For example, if the present operation uses Root Pointer value before replacement, a table access with four steps is performed again. In this case, when a Context Pointer Register value is changed, all entries including the Root Pointer are invalidated. But, since the above Context Pointer Register value is not frequently changed, it does not matter that the Context Pointer Register value is not included in the comparative part. Moreover, when the extended auxiliary cache flush operation is implemented, invalidation of the Root Pointer is not needed, and the Pointer within the corresponding context is invalidated. Some of the peripheral circuits are needed in this case.

Here, the Decoder 50 exists to realize a replacement policy when new entries are stored. A Pointer valid signal is one of the control signals supplied to the control circuitry. When the Pointer valid signal is asserted during TLB miss, the page table is accessed using the Pointer in RAM input register 58. Moreover, when Pointer valid signal is not asserted, the page table is accessed using the higher Pointer by examining high Pointer valid value. For example, if First level PTP valid signal is not asserted, the page table is accessed using the Root Pointer by examining Root Pointer valid value.

And a CAM input register 56 shown in FIG. 4 also has a CXN and TAG parts. The CXN part receives the Context from the context register 10, and the first through third indexes can be stored into the TAG part. The RAM input register 58 receives one among the root pointer from the root point extracting stage, the first level PTP from the first level PTP extracting stage, the second level PTP from the second level extracting stage, and the PTE from the PTE extracting stage.

In FIG. 4, an OR gate 60 performs an OR logical operation for match signals from the CAM 52 and supplies an output signal to an AND gate 62. The output signal of the OR gate 60 goes to high logic when one among the match signals is in high logic. The AND gate 62 performs the output signal of the OR gate 60 and the pointer valid signal in AND logical operation. An Output signal of the AND gate 62 is supplied to the hit determiner 34, as the hit signal.

Figure 5:
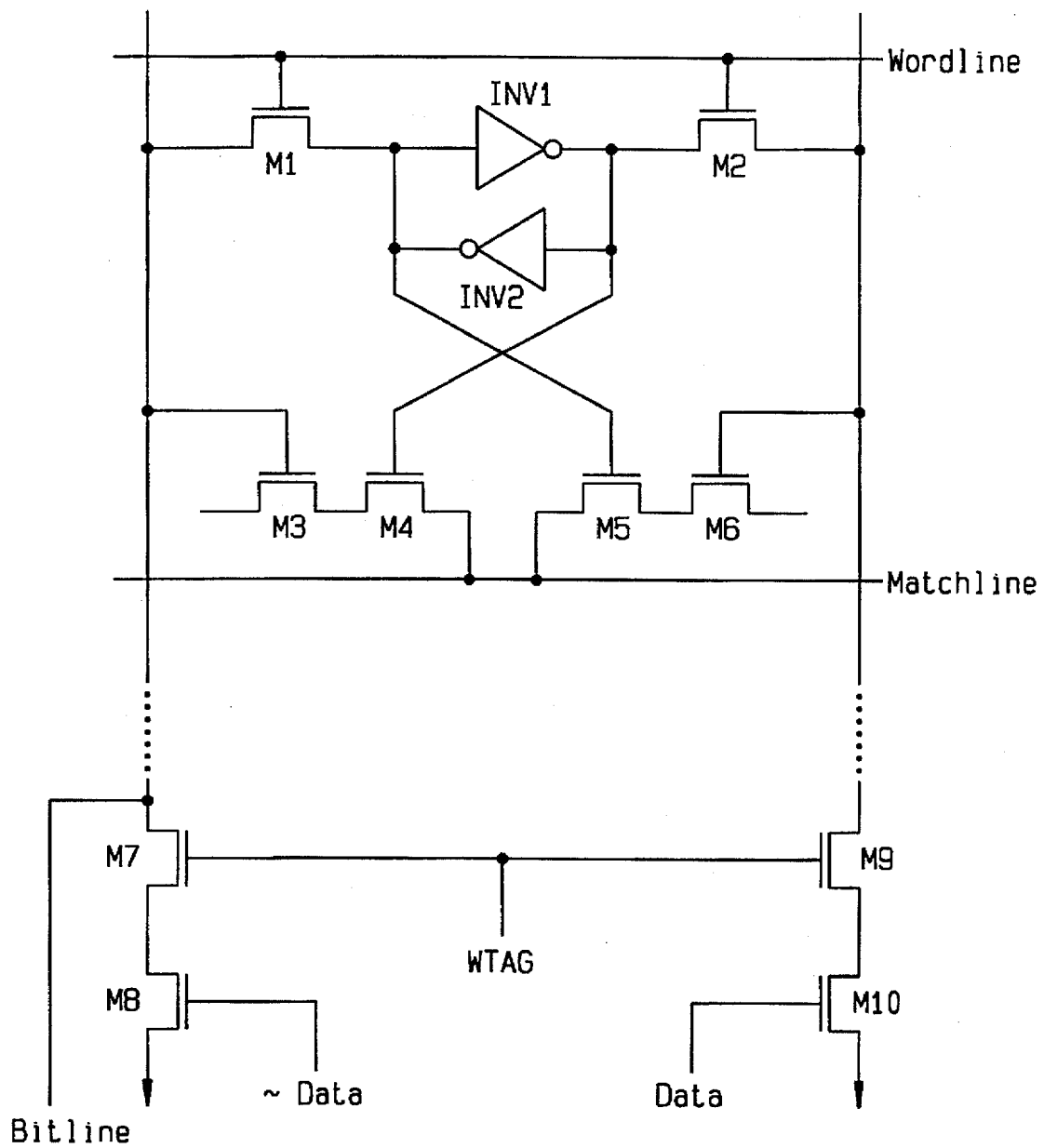
FIG. 5 is a circuit diagram illustrating the detailed construction of a CAM cell constituting the CAM shown in FIG. 4.
Figure 6:
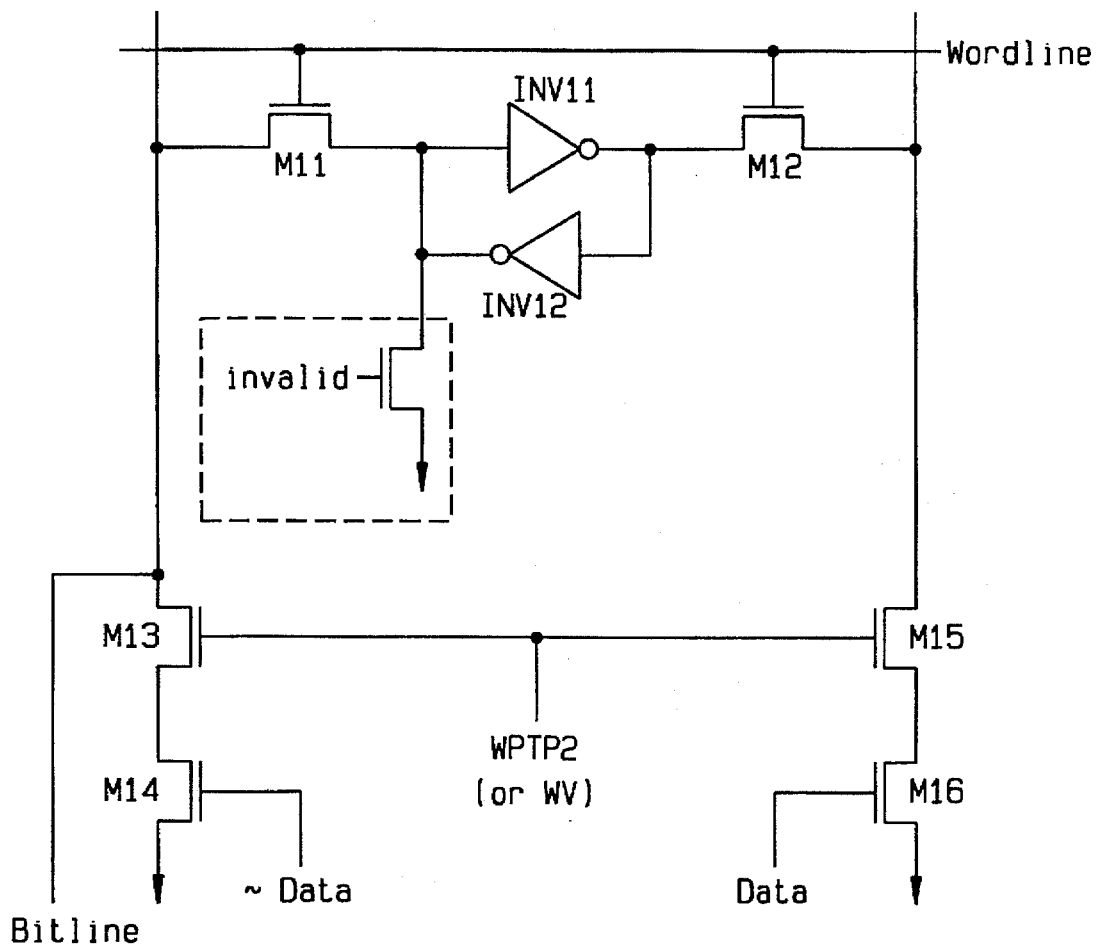
FIG. 6 is a circuit diagram illustrating the detailed construction of a RAM cell constituting the RAM shown in FIG. 4.
Figure 7:
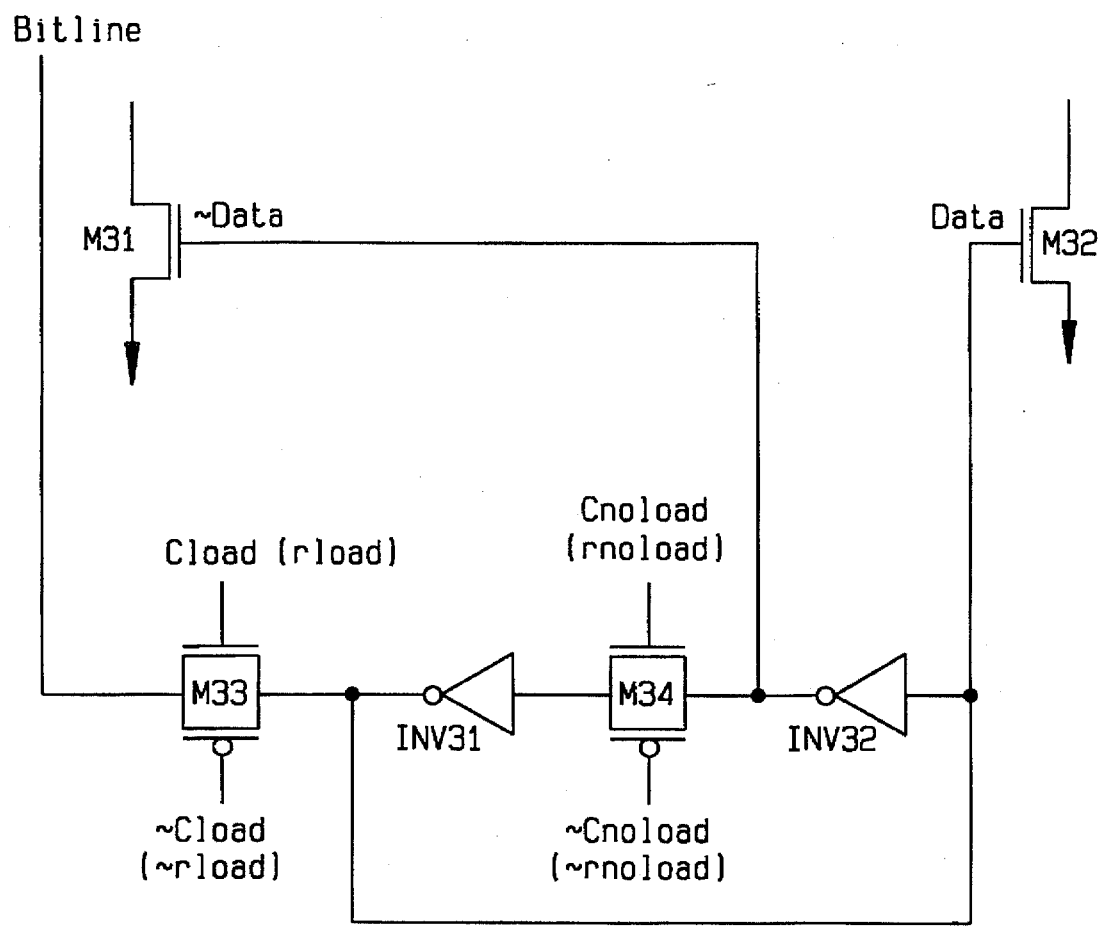
FIG. 7 is a circuit diagram illustrating the detailed construction of a register cell constituting a CAM input register or a RAM input register shown in FIG. 4.

FIG. 5 is a detailed block diagram for CAM cell consisting of CAM 52 indicated in FIG. 4; FIG. 6 is a detailed block diagram for RAM cell consisting of RAM 54; FIG. 7 is a detailed block diagram for 1 bit cell of CAM input register 56 and RAM input register 58.

Referring to FIG. 5, WTAG signal is a control signal produced in the control part when the value of CAM input register 56 is written onto CAM 52. Referring to FIG. 6, WPTP 2 signal is a control signal produced in control part when Pointer part of RAM input register 58 shown in FIG. 4 is written onto RAM 54; WV signal is a control signal when valid (v) bit of RAM input register 58 is written onto RAM 54.

As shown in FIG. 5, the dotted-line part, used only in the bit part, is an additional part to invalidate all entries at the same moment.

Referring to FIG. 7, 1 bit of CAM (RAM) input register supporting read/write ability from CAM (RAM) is described. For performing the above ability, it consists of two CMOS pass transistors (M33, M34) and two Inverters (INV31, INV32) and contains feedback path.

The process of reading or writing information to CAM (RAM) from CAM (RAM) input register is described in detail as follows. At first, it is described that the information from CAM input register 4 is written onto CAM 52 part. A miss of extended auxiliary cache occurs when there is a miss of lower extended auxiliary cache which is a specific operational memory apparatus serving to determine whether the given segment and page are placed in the main memory, and the above information is stored to the extended auxiliary cache for a reuse next time when all processes of the address translation are operated to obtain a PTE (Page Table Entry). At that point, after being latched to CAM and RAM input register 56 and 58, data is written to CAM and RAM 5 and 54.

As shown in FIG. 7, when external information is latched to input register, Cload and Cnoload of CMOS pass transistor M33 is not asserted, and WTAG signal indicated in FIG. 5 is not enabled either. After that, when information is latched to RAM input register 58, load of CMOS pass transistor M33 and rnoload of CMOS pass transistor M34 are not asserted, and WPTP 2 and WV signal indicated in FIG. 6 are not enabled either. When one considers the process of information of CAM input register 56 being written onto CAM 52 part, Cload of CMOS pass transistor M33 and Cnoload of CMOS pass transistor M34 are not asserted, and WTAG signal shown in FIG.5 is asserted. At this time, if the wordline is enabled, the data is written within a cell.

As described above, when information from RAM input register 58 is written onto RAM 54, rload of CMOS pass transistor M33 and rnoload of CMOS pass transistor M34 are not asserted, and WPTP 2 and WV signal, as shown in FIG. 6, are asserted. At this time, data is written within a cell because wordline is enabled. As CAM 52 compares all entries (CAM part) for determining whether CAM has corresponding information when address translation is performed, data compared with outside is latched only by CAM input register 56. Thereafter, when wordline is disabled, only WTAG signal, as indicated in FIG. 5, is enabled. At this time, if a match is made, matchline is enabled, and RAM 54 is then read.

According to the process of generating the control signal during data comparison of CAM 52, when the data is latched to CAM input register 56 from outside, Cload of CMOS pass transistor M33, Cnoload of CMOS pass transistor M34, and WTAG signal shown in FIG. 5 are not asserted. At this time, when the data of input register is transmitted to CAM 52 through bitline for comparison, only WTAG signal is asserted, and the wordline signal is enabled.

When the data of CAM 52 is compared, the control signal is also generated when data from RAM 54 is latched to RAM input register 58 through matchline. In this case, rload of CMOS pass transistor M33 is asserted, and rnoload of CMOS pass transistor M34 and WPTP 2 or WV shown in FIG. 6 are not asserted. In the case when the information of RAM input register 58 is written to outside, rnoload of CMOS pass transistor M34 is asserted, and rload of CMOS pass transistor M33 and WPTP 2 or WV signal shown in FIG. 6 are not asserted, where it is not necessary that the content of CAM 52 part is written to CAM input register 56 during a normal operation. Therefore, the above operation is used for diagnostic objectives. Moreover, since WPTP2 and WV shown in FIG. 6 are not used independently for RAM 54 part during normal operation. WPTP 2 and WV signal can be used for diagnostic objectives, so they can be replaced by one control signal. When RAM 54 part is written for diagnostic objectives, RAM 54 part is written to RAM input register 58 without additional hardware through matchline during the comparative process of CAM 52 part. Moreover, when a match occurs, input of RAM 54 part transmitting to the wordline is enabled. Also, when RAM 54 part is written or read, input of RAM 54 part transmitting to the wordline is enabled by output from Decoder 50.

As apparent from the above description, the memory management unit having an address translation function in accordance with the present invention can detect a portion of virtual address, which can be directly translated, using a plurality of cache memories having a comparison function. The memory management unit can achieve an address translation in accordance with a table work after directly translating the detected virtual address portion. Accordingly, the memory management unit of the present invention can set the address translation procedure appropriately. Furthermore, it is possible to improve the address translation speed over a certain limit and to minimize the deviation in response speed for physical address.

What is claimed is:

1. A memory management unit with address translation function for use in a computer system, capable of translating a virtual address into a physical address by accessing a context table and first, second and third page tables located in main memory, comprising:

a context register for receiving a present context number a context pointer register for receiving a context pointer;

an address register for receiving the virtual address having a page offset and first, second and third indexes;

first translating means for translating directly the context number and the first, second and third indexes into a physical page number and generating a first hit signal, said hit signal indicating whether the translation to the physical page number is successful;

second translating means for translating directly the context number and the first and second indexes into a first level page table pointer and generating a second hit signal;

third translating means for translating directly the context number and the first index into a second level page table pointer and generating a third hit signal;

fourth translating means for translating directly the context number into a root pointer and generating a fourth hit signal;

first address retrieving means for reading a root pointer from the context table by using the context number and the context pointer;

second address retrieving means for reading the second level page table pointer from the first page table by using the first index and the root pointer from the first address retrieving means if the fourth hit signal is off or the root pointer from the fourth translating means if the fourth hit signal is on;

third address retrieving means for reading the first level page table pointer from the second page table by using the second index and the second level page table pointer from the second address retrieving means if the third hit signal is off or the second level page table pointer from the third translating means if the third hit signal is on;

fourth address retrieving means for reading the physical page number from the third page table by using the third index and the first level page table pointer from the third address retrieving means if the second hit signal is off or the first level page table pointer from the second translating means if the second hit signal is on;

address combining means for concatenating the page offset and the physical page number from the first translating means if the first hit signal is on or the fourth address retrieving means to generate the physical address if the first hit signal is off; and hit determining means for checking logic values of the first through fourth translating means to control the operations of the first through fourth address retrieving means in accordance with the logic values of the first through fourth translating means.

2. A memory management unit of claim 1, wherein each of the translating means comprises a content addressable memory for storing searchable indexes and a random access memory for storing data associated with the searchable indexes.

3. A memory management unit of claim 2, wherein the content addressable memory comprises an array of content addressable cells formed in accordance with CMOS technology.

* * * * *